July 21, 1959 L. W. MURPHY 2,895,164
APPARATUS AND PROCESS FOR FACILITATING SLAUGHTER
AND FOR BLEEDING SLAUGHTER ANIMALS
Original Filed Nov. 14, 1955 2 Sheets-Sheet 2
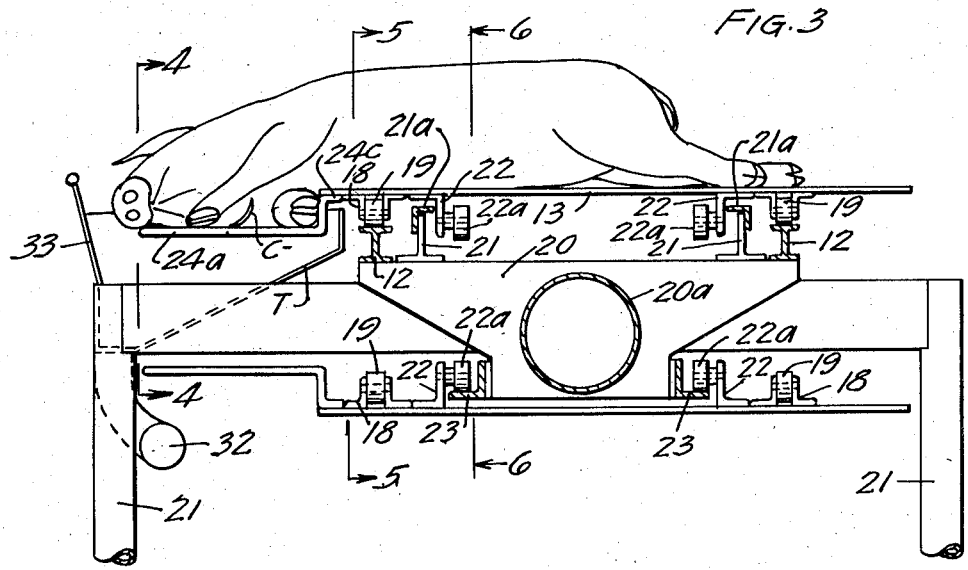
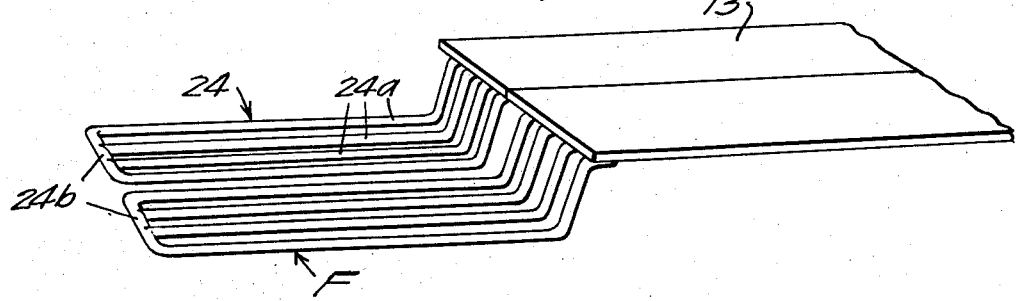
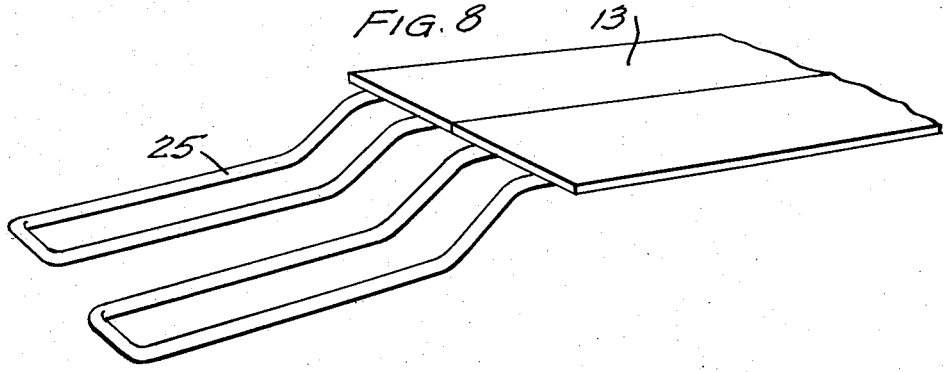
INVENTOR
LAURENCE W. MURPHY
BY
Williamson, Schroeder, Adams & Palmater
ATTORNEYS United States Patent Office 2,895,164
Patented July 21, 1959

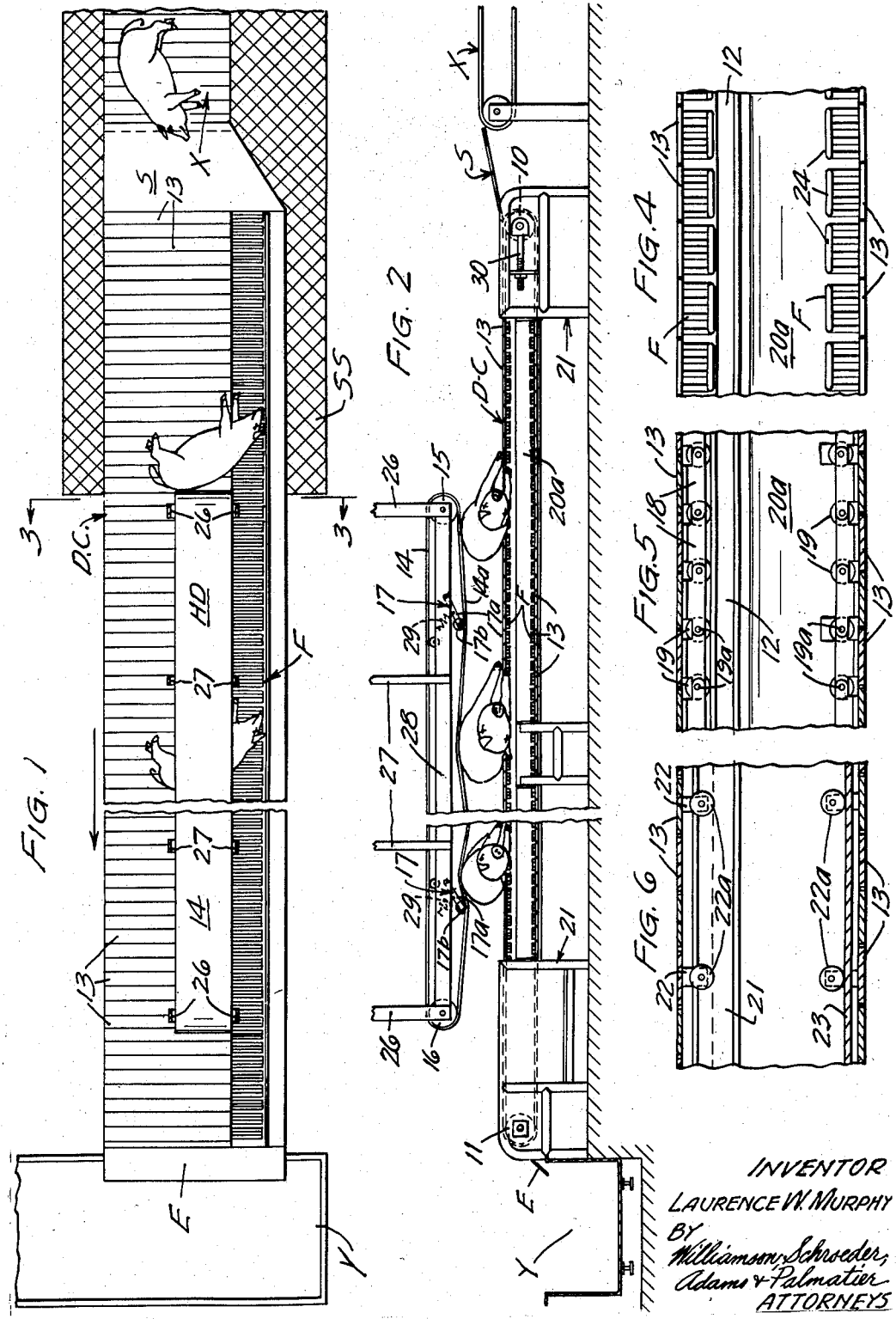

2,895,164

APPARATUS AND PROCESS FOR FACILITATING SLAUGHTER AND FOR BLEEDING SLAUGHTER ANIMALS

Laurence W. Murphy, Austin, Minn., assignor to Geo. A. Hormel & Co., Austin, Minn., a corporation of Delaware Original application November 14, 1955, Serial No. 546,622, now Patent No. 2,841,817, dated July 8, 1958. Divided and this application January 27, 1958, Serial No. 711,532

5 Claims. (Cl. 17—45)

This invention relates to apparatus and processes for facilitating the slaughter, for slaughtering and for efficiently bleeding slaughter animals to effect economies and to substantially eliminate injury to the hams, with a maximum recovery of blood during the bleeding.

This application is a divisional of my co-pending application, Serial No. 546,622, filed November 14, 1955, now Patent No. 2,841,817, issued July 8, 1958.

This invention has an important and combinative process relation with the invention disclosed in my United States Letters Patent No. 2,733,477 and No. 2,526,037. In said patents, a valuable process and apparatus were disclosed for continuously and successively immobilizing and delivering slaughter animals such as hogs, steers, fowls and others prior to the sticking operation. The animals were conveyed or otherwise moved in a substantially, continuous file between side walls or rails to prevent them from turning as they pass through an anesthetizing chamber in such travel wherein carbon dioxide or other satisfactory gas was administered under uniform control, to an extent only to immobilize the voluntary processes of the animals without retarding the involuntary processes such as breathing and circulation of blood stream. My said disclosed improvements on the apparatus and process of my original patents in that a more uniform and continuous file or stream of animals is assured with employment of a minimum number of prodders or attendants and whereby, such animals, just prior to entrance and travel through the anesthetizing chamber and throughout the travel therein, are physically separated or spaced apart to positively prevent stampeding, crowding or piling up of the animals in their file or lane preparatory to enduring anesthetizing.

My present invention makes provision for successively receiving immobilized animals and for moving the same in spaced, transverse relation through a predetermined path of travel, thereby facilitating without the use of shackles, elevating conveyors, etc., the proper sticking of said animals with no injury to the hams from rupture or capsule fracture of hip joint. The labor of shackling the rear legs of a slaughter animal and then suspending the same from a moving, overhead conveyor is eliminated and apparatus is employed for disposing the head and shoulder of the animal before slaughter or sticking, in a position to cause the cut to remain open and in position to most efficiently bleed the animal. The time duration of the travel of said animals through the predetermined course is adequate with my improved facilities for holding the wound open, to thoroughly bleed the animals in accordance with requirements of Federal law.

More specifically, it is an object of my present invention to provide a process for continuously and successively receiving an immobilized slaughter animal in transverse, substantially horizontal position and for retaining the same in such position and moving the animal through a predetermined course and in said travel, first sticking or slaughtering the animal and thereafter, moving it through said course through a time period to adequately effect thorough bleeding thereof while holding during such travel, the animal in a position most favorable to keep the wounds or cuts open to facilitate bleeding and also, during such travel, to collect all blood. Preferably, the animals while disposed horizontally, are disposed from head to rear with the center line and back line of the animal at an angle of substantially 60 degrees with reference to the line of travel or center line of the conveyor or other means for producing travel.

Another object is the provision of efficient apparatus for receiving and conveying in successive order, a plurality of immobilized slaughter animals, said apparatus including an efficient conveyor, preferably of the deck type, on which the animals are disposed in spaced, transverse, substantially parallel relation, preferably inclined at angles of 60 degrees from head to rear with reference to the center line and direction of travel of the conveyor. The said apparatus and conveyor includes a means whereby the torso and main portion of the body of the animals are supported upon a deck-like conveyor portion while the heads and at least most of the shoulders of the animals, are disposed on a portion of a conveyor which is foraminous for permitting passage of blood therethrough and which portion of the conveyor served to tilt the heads slightly forward and downward, keeping the cut from the sticking open and most efficiently draining the blood, all without the use of shackles and overhead conveyors, from which animals have formerly been suspended by the one hind leg, as common or accepted practice.

A further object in apparatus and a process of the class described, is the provision of means regardless of the individual length of adjacent animals in successive line, to retain the animals individually in proper transverse relation to the travel or conveyor, even though reflex actions after sticking occur, said transverse relation preferably being at 60 degrees rather than 90 degrees to the center line of the conveyor.

These and other objects and advantages of my invention will more fully appear from the following description made in connection with the accompanying drawings wherein like reference characters refer to similar parts throughout the several views, and in which:

Fig. 1 is a plan view of an embodiment of my apparatus with the medial portion thereof broken away and the view thus fore shortened;

Fig. 2 is a side elevation of the same;

Fig. 3 is a vertical section taken approximately on the line 3—3 of Fig. 1, looking in the direction of the arrows;

Fig. 4 is a vertical, longitudinal section taken substantially on the line 4—4 of Fig. 3, looking in the direction of the arrows;

Fig. 5 is a longitudinal, vertical section taken substantially along the line 5—5 of Fig. 3, showing the support of the deck conveyor upon suitable track or rails;

Fig. 6 is a longitudinal, vertical section taken approximately along the line 6—6 of Fig. 3, looking in the direction indicated by the arrows and showing the support for the under run of the endless deck conveyor; and Figs. 7 and 8 are fragmentary, prospective views showing two forms of foraminous or fork rod structure for supporting the head and forelegs of slaughter animals.

In the embodiment of the invention illustrated my apparatus utilizes an elongated deck conveyor DC of endless type trained about rearward and forward sets of sprocket wheels 10 and 11 and roller supported upon a track comprising the rails 12 (see Fig. 3).

When combined for use with my apparatus disclosed in said patents, deck conveyor DC receives animals having been previously immobilized as by anesthesia from the delivery end X of the conveyor delivering from the anesthesia chamber, a gradually declined slide section S being interposed between the delivery end of conveyor X and the receiving end of deck conveyor DC.

The immobilized slaughter animals are disposed in spaced relation longitudinally of the delivery conveyor X and are turned from that position to a transverse position as they pass down the slide section S. This is readily accomplished by grasping the animal by the forelegs or rear legs and turning as the animal is sliding down the section S.

The deck conveyor DC is of a width to more than accommodate the entire length of the particular slaughter animal on which the apparatus is to be used. One longitudinal side of said deck conveyor of a marginal width to nicely accommodate the head and most of the forelegs of the slaughter animals is constructed of rigid, foraminous material indicated as an entirety by the letter F and is depressed as clearly shown in Figs. 3 and 7, in relation to the main deck of the conveyor on which the bodies of the animals are supported and which in the form shown, comprises a multiplicity of linked, transverse flat slats of leaves 13.

A sticker station or platform SS is provided forwardly of the slide section S extending longitudinally of the foraminous, marginal portion of deck conveyor DC. In this station, as the animal is moving slowly in travel S, the sticker makes a non-conventional sticking and cut, severing the desired carotid artery and jugular vein. The cut C so made, as clearly shown in Fig. 3, is disposed medially over the foraminous portion of the deck conveyor, so that the blood may pass therethrough into a longitudinal blood-collecting trough T which extends the full length of the deck conveyor.

Directly after sticking or slaughter, the hogs or other slaughter animals are engaged from above by a longitudinally extending, variable hold-down conveyor indicated as an entirety by the letters HD. As shown, this conveyor comprises an endless apron 14 trained over a transverse, rear roller 15 and a forward roller 16, said forward roller being suitably driven in synchronization with the speed of travel of the deck conveyor DC. The under-run 14a of the hold-down apron is yieldingly urged downwardly by a series of hanger rollers 17 and engages the girth of the slaughter animals even though they vary considerably in cross sectional dimensions and length, thereby retaining the animals in proper transverse position on the deck conveyor even though reflex actions occur in the animals subsequent to sticking.

The length of the deck conveyor DC related to the speed of travel of the same is such that through the involuntary heart action of the animals after sticking, the same will be fully bled during their travel and before they reach in travel, the delivery end E of the deck conveyor. The hold-down conveyor HD, it will be noted, terminates quite short of the delivery end of the deck conveyor, as shown in Figs. 1 and 2.

Referring more in detail to the specific form of deck conveyor illustrated (see Figs. 3 to 6 inclusive), I interconnect the multiplicity of slats or leaves 13 of conveyor DC with two lines of suitable links 18, said links at their ends being pivoted together by pins 19a which as shown, also constitute the journals for supporting rollers 19. Rollers 19 are supported upon and roll upon the two rails 12 of the supporting track. For strength as shown, the links comprise outer and inner sections, as stated, pivotally interconnected to form endless chains which are disposed inwardly some distance from the respective longitudinal edges of the deck conveyor and which chains are driven at the forward end of deck conveyor through the sprockets 11, the shaft of which is connected with a suitable source of power, not shown.

The supporting rails 12 for the deck conveyor, as shown, are secured to and supported from the top of widely spaced, heavy bolsters 20 which are centrally supported from an upstanding, heavy supporting framework designated as an entirety by the number 21. Bolsters 20 and consequently, portions of the framework are interconnected by an elongated, rigid sleeve 20a which passes through the bolsters and tightly fits same. Bolsters 20 also support the longitudinal guard rails 21 as shown in the form of inverted T-bars having angle bars 21a at the upper ends thereof, welded or otherwise rigidly secured. The upper flanges of members 21a extend horizontally inward short distances to in straight line fashion, engage against depending roller brackets 22 which are secured beneath the respective slats 13, thereby preventing lateral displacement of the slats relative to the supporting rails 12. Such engagement of course, only occurs in a guiding fashion if there is a tendency for lateral displacement of the deck conveyor.

Also rigidly secured to and supported from bolster 20 at the bottom portion thereof are angle iron supporting rails 23 spaced the requisite distance apart to engage the rollers 22a on the lower run of the deck conveyor (see Fig. 3). Said lower run is thus supported and smoothly travels across the tracks afforded by angle bars 23.

Referring more specifically to the foraminous, longitudinal side or marginal portion F of the deck conveyor I prefer to provide one end of each of the deck slats 13 with an offset or depressed fork structure 24 which is preferably made from rigid rod material. In the form shown in Fig. 7, the outwardly extending rods 24a are four in number, being spaced in parallel relationship and interconnected at their outer ends as by welding with rod section 24d. The inner ends of rods 24a are bent upwardly and then horizontally inward, affording shanks 24c (see Fig. 3) which are welded or otherwise rigidly affixed to the end of the slat 13 thereabove. The extent of offsetting of the fork structure 24 from the top surface of the slats depends of course upon the dimensions of the slaughter animals to be accommodated. In the case of hogs, this distance usually varies from 3 to 4½ inches.

In Fig. 8, an alternative form of forked or foraminous head and foreleg supporting structure is shown for the slats comprising simply an integral rod 25 which is bent in hairpin fashion with its shanks connected as in the case of rod 24 with the adjacent end of its supporting slat 13. In this form of fork structure, the rod or rods are inclined obliquely from their integral connection with the attached shanks and then are disposed horizontally throughout the greater portion of their lengths as clearly shown in Fig. 8.

Referring again to the hold-down conveyor HD, the same is suitably supported from overhead by heavy end and intermediate straps 26 and 27 respectively, said straps being connected at their lower ends with horizontal, elongated beams 28, one disposed at each side of the conveyor. The tensioning or hanger brackets 17 which are spaced longitudinally at the bottom of the conveyor, have side arms 17a which are pivoted at their rear and upward ends to the beams 28 of the hanger frame and carry depending rollers 17b at their outer ends, which rollers actually engage the bottom run 14a of the apron. The arms 17a of the brackets are urged downwardly by suitable means such as pressure springs 29 or the equivalent.

The deck conveyor DC is driven by suitable power source at its forward end and its speed of travel is synchronized with the travel of the hold-down conveyor HD. As shown, suitable chain-tighting mechanism indicated as an entirety by the numeral 30, is provided within the rear confines of the deck conveyor chains on conveyor DC and at each side thereof. The longitudinal blood-collection trough T has a bottom declined towards the outer edge thereof and providing a sump adjacent the longitudinal outer edge of the apparatus from which, at spaced points, suction pipes or the like 32, are connected. Trough T at its outer side, has a relatively high splash side 33 as shown in Fig. 3.

The deck conveyor, in the embodiment illustrated, delivers the slaughtered animals after bleeding, to a soaking and scalding tub identified as an entirety by the letter Y.

Process

The steps of my novel process with or without inclusion of the immobilizing steps, preferably anesthesia, are for the most part pointed out in the foregoing description of the embodiment of apparatus illustrated.

It is essential in my process that the slaughter animals which may include hogs, cattle, sheep and also large fowls, be immobilized and delivered successively, one at a time prior to travel for the sticking and blood letting operations.

It is highly desirable in immobilizing the involuntary functions of such animals that they be not shackled or suspended from their hind legs, as is the usual procedure before sticking. I prefer to employ the method and apparatus of my said patents wherein the slaughter animals are moved at a fairly slow speed, standing on their own legs through an anesthetizing chamber. Here, under control, anesthesia is administered to an extent to cause immobilization of the voluntary processes and the animals slump to prostrate position without producing stretching or straining of the branches of the acetabular artery located in the ligaments and without rupture of hip joint capsules, or joint of femur and ilium.

In recent years, the hemorrhaging by hogs and other slaughter animals through stretching of the limbs by suspension of the weight of the animal therefrom through shackles and overhead trolleys, has often produced hemorrhages by tearing of the branches of the acetabular arteries and/or by tearing of the hip joint capsules. Blood and synovial fluid, as a result of tearing of the acetabular arteries and capsules emerged from the joint cavity and followed intermuscular septum to the surface or interior of the ham. Hemorrhaging was severe, since even after sticking, the involuntary processes including blood circulation and breathing continue for some time. The monetary loss to packers through the necessary downgrading of such hemorrhaged meat has been very substantial and in many instances, ham sold to consumers had hemorrhages which were not detected since they did not reach the surface.

My process includes, after efficiently immobilizing the voluntary processes of the animals, the conveying or moving of said animals successively in spaced relation through a predetermined travel related to an element of time while retaining the head and any portion of the shoulder of said animals at a somewhat lower level than the bodies thereof to thereby cause the incision from sticking, to remain open. The preferred incision made in carrying out my process is made at an angle of 70 degrees to the backbone of the hog, which is non-conventional but is found to assist in keeping the incision open.

The process as an essential element, includes the efficient sticking of the slaughter animal in a reclined or prostrate position while slowly traveling through a predetermined path and the continued positioning of the animal in said path before and after sticking, as previously described.

My process also includes the collection of all blood during the predetermined travel of the animal as well as the retention or holding of the animal during a travel sufficient from point of time for complete bleeding to the end that the positioning of animals successively in the line of travel will not be disturbed even through certain reflex actions occur subsequent to the step of sticking.

While other apparatus and substitute for component elements thereof may be employed for carrying out my novel process, the type of apparatus illustrated herein is particularly well adapted for attaining high end results.

First, with the declined slide S, it is easy for an operator by grasping the animal's ears and forelegs, to turn the delivered animal to a position on its side transversely of the deck conveyor with the head and forelegs or at least most of the forelegs supported upon the depressed, foraminous section F which as shown in the aggregate, consists of the fork rod structure.

No shackling of one or two of the rear legs of the animal is required, thereby eliminating substantial labor costs.

The sticker, a highly skilled technician, stands or sits on his station SS, rapidly making the necessary incision at the throat of the animal whose head is disposed above the adjacent marginal portion of foraminous construction.

Very shortly after sticking, the animal in transverse position as shown in Figs. 1 and 2, travels under the holddown conveyor HD and even though the girth and length of the successive animals varies considerably, the spring-actuated, resilient construction applied to the lower run of apron 14a, causes all of the animals to be engaged and held down individually to prevent displacement from the predetermined, transverse position upon the deck conveyor.

To my knowledge, it was heretofore unknown that a slaughter animal could be completely and successfully bled while being moved in prostrate position.

With the positioning of the head and at least portions of the forelegs through the use of my apparatus, the cut at the throat of the animal is caused to be held open and the blood pours out, it has been found after exhaustive tests in many instances, as completely and rapidly as when an animal is suspended by its hind legs in the manner now extensively and commercially used. All blood trickles through the fork rods 24 dropping to the collection trough T from which it is constantly removed by suction pumps connected to the trough at intervals by conduits 32.

The time interval of travel of the animal after sticking is such that complete bleeding as required by Federal law, is effected before each animal is delivered from the deck conveyor DC.

From the foregoing description, it will be seen that throughout the steps of my novel process and with the apparatus herein described, there can be no rupture of the joint capsule of the ham of the animal nor can there be any stretching of limbs or cutting or tearing of veins or of the hip joint capsules at the hip joint or elsewhere. Consequently, the previously objectionable hemorrhaging has been eliminated with a great saving to packing houses in the slaughtering of domestic animals.

With the use of my inventions the laborious shackling of live hogs or other slaughter animals and fowls may be eliminated with attendant saving in labor and with the substantial elimination during sticking and bleeding operations, of hemorrhaging and down-grading of meat through tearing of arteries or fracture of joint capsules formerly due to overhead suspension of animals before and after slaughter, by their hind legs.

What I claim is:

1. The process of slaughtering and bleeding slaughter animals after the voluntary processes of said animals have been immobilized, which consists in supporting and substantially horizontally moving at slow speed a plurality of said animals disposed in horizontal, transverse relation to their line of travel, successively sticking said animals during their initial movement and continuing the movement of said animals for a predetermined time travel adequate for full bleeding of the stuck animals and collecting the blood from said animals as they travel through said path.

2. The steps of the process as defined in claim 1 further characterized by the continued support of the head and throat of said animals at a level somewhat below the support level of the body of said animals throughout the travel of said animals.

3. The steps of the process as defined in claim 1 further characterized by the step of applying light downward pressure individually against the animals during their travel to retain the same against displacement from their transverse relation due to reflex actions after sticking.

4. The process of slaughtering and bleeding slaughter animals which consists in first immobilizing the voluntary processes of the animals without affecting the involuntary processes and without bruising or causing hemorrhaging of the ham thereof, successively delivering said immobilized animals disposed in substantially spaced, parallel relation transversely of the line of travel and continuing to support and move said animals in said line of travel past a sticker's station, sticking the throat and carotid artery and jugular vein of each animal successively at said station and continuing to move said animals in said relationship with the shoulders and heads supported at a slightly lower level than the bodies thereof for a period of travel sufficient to permit thorough bleeding thereof, said support of said head causing the cuts from the sticking operation to remain open.

5. The process of slaughtering and bleeding a slaughter animal which consists in first immoblizing the voluntary processes of the animal without affecting the involuntary processes and without bruising or causing hemorrhaging of the legs thereof, and supporting the immobilized animal in horizontal position with shoulder and head supported at a slightly lower level than the torso, moving said animal so supported in a line of travel past a sticker station, sticking the throat and carotid artery and jugular vein of the animal while it is traveling in said line and continuing to move the animal in said position for a period of travel sufficient to permit thorough bleeding thereof.

References Cited in the file of this patent

UNITED STATES PATENTS

| | | |
|---|---|---|
| 2,526,037 | Murphy | Oct. 17, 1950 |
| 2,737,683 | Regensburger | Mar. 13, 1956 |